United States Patent
Goldman et al.

(10) Patent No.: US 7,835,282 B2
(45) Date of Patent: Nov. 16, 2010

(54) DYNAMIC THROTTLING OF PRIORITY SERVICE CALLS

(75) Inventors: Stuart O. Goldman, Scottsdale, AZ (US); Richard E. Krock, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 234 days.

(21) Appl. No.: 11/983,224

(22) Filed: Nov. 8, 2007

(65) Prior Publication Data

US 2009/0122701 A1   May 14, 2009

(51) Int. Cl.
*G01R 31/08* (2006.01)

(52) U.S. Cl. .................................... 370/232

(58) Field of Classification Search ............... 370/229, 370/232, 233, 234, 230, 235
See application file for complete search history.

(56) References Cited

U.S. PATENT DOCUMENTS

| | | | | |
|---|---|---|---|---|
| 5,500,889 | A * | 3/1996 | Baker et al. ............ | 379/112.04 |
| 5,933,481 | A | 8/1999 | MacDonald | |
| 6,792,099 | B1 * | 9/2004 | Na ........................ | 379/221.09 |
| 7,301,905 | B1 * | 11/2007 | Tontiruttananon et al. ... | 370/232 |
| 2003/0220115 | A1 | 11/2003 | Hitzeman | |

OTHER PUBLICATIONS

PCT/US2008/012457, International Search Report, Feb. 20, 2009, 5 Pages.
PCT/US2008/012457, Written Opinion of the International Searching Authority, Feb. 20, 2009, 6 Pages.
Smith, Ensuring Robust Call Throughput and Fairness for SCP Overload Controls, IEEE/ACM Transactions on Networking, vol. 3, No. 5, New York, US, Oct. 1995, pp. 538-548.
ITU-T Series Q: Switching and Signalling, Signalling Requirements to Support the International Emergency Preference Scheme (IEPS), Supplement 53, Telecommunication Standardization Sector of International Telecommunication Union, Sep. 2005, 24 Pages.
TD 220 (WP2/16) Temporary Document, IETF RFC 4190 on Framework for Supporting Emergency Telecommunications Service (ETS) in IP Telephony, Telecommunication Standardization Sector of International Telecommunication Union, Geneva, Apr. 3-13, 2006, 20 Pages.

* cited by examiner

*Primary Examiner*—Kwang B Yao
*Assistant Examiner*—Anh Ngoc Nguyen
(74) *Attorney, Agent, or Firm*—Fay Sharpe LLP

(57) ABSTRACT

A method of throttling priority service traffic in a telecommunications network is disclosed. The method includes: monitoring a rate at which priority service requests are received at a node of the network; comparing the rate to a threshold; disabling a gapping function for priority service traffic when the rate is less than the threshold; enabling the gapping function for priority service traffic when the rate is not less than the threshold, and, dynamically regulating a parameter of the gapping function when the gapping function is enabled.

20 Claims, 2 Drawing Sheets

DYNAMIC THROTTLING OF PRIORITY SERVICE CALLS

FIELD

The present inventive subject matter relates to the telecommunication arts. Particular application is found in conjunction with certain types of priority services and telecommunication networks, and the specification makes particular reference thereto. However, it is to be appreciated that aspects of the present inventive subject matter are also amenable to other like applications and/or networks.

BACKGROUND

In general, it is known to provision telecommunication networks with priority services. For example, the Government Emergency Telecommunication Service (GETS) is employed in the Public Switched Telephone Network (PSTN) to provide priority service to NS/EP (National Security/Emergency Preparedness) personnel. Similarly, WPS (Wireless Priority Service) is employed in cellular or mobile telecommunication networks. Generally, the goal of priority service is to provide a higher probability and/or rate of call completion for selected calls. As is understood in the art, GETS and/or WPS calls receive priority handling as compared to ordinary calls (i.e., non-priority calls).

As can be appreciated, in times of emergency or crisis or otherwise, telecommunication networks can become congested by an unusually heavy call volume. Moreover, natural or other catastrophes may impair or damage network facilities thereby reducing the networks capacity to handle the increased call volume. The unusually high call volume and/or reduced network capacity tends to increase network congestion and limit the network's ability to complete ordinary calls. Services like GETS and WPS and other similar priority services supported by telecommunication networks are employed by users to obtain higher priority for completing calls utilizing these services as compared to ordinary calls.

In order to receive access to a priority service, a user generally subscribes to the particular service or otherwise registers to use the service. To use the service in connection with a particular call, the subscriber typically enters or otherwise submits a password, a user name or number or other ID and/or other authentication credentials at or near the time the call is placed. The submitted credentials are used by the network to verify that the user is in fact a subscriber to the priority service or is otherwise entitled to use the priority service. Provided the supplied credentials are valid, the call associated with the invoked priority service is accepted and generally given priority by the network over ordinary calls, e.g., for purposes of call completion. On the other hand, if the credentials are not valid, then the call is denied as invalid. That is to say, no attempt is made within the network to complete the call.

Customarily, in a Next Generation Network (NGN) (e.g., such as those implementing an Internet Protocol (IP) Multimedia Subsystem (IMS)), a finite amount of network resources are generally allotted or available for handling priority call and/or session requests. Accordingly, a throttling mechanism is commonly employed to limit or otherwise regulate the number of priority call/session requests accepted from a given source and/or handled by a given network node. In particular, a call gapping technique is typically used to achieve the aforementioned throttling when the number of priority call/session requests from a given source, or being handled by a network node responsible for serving that source, exceed a preset value assigned thereto. Conventional call gapping defines periodically reoccurring fixed windows of time or "gaps" during which a limited or otherwise preset number of priority call/session requests are accepted. Once the limit has been reached for a particular gap, no more requests are accepted until the next gap arrives or opens.

While generally acceptable in some circumstances, the foregoing approach to throttling and/or call gapping is unsatisfactory in other respects. For example, one problem with the foregoing implementation is that the preset gapping parameters may not at times accurately reflect the number of priority service subscribers or users at a particular source or accessing a particular node in question. Rather, the preset parameters generally reflect some normal or historical priority service subscriber level at the location or using the node of interest. In many circumstances, the actual level might vary widely from the norm. For example, if there were a convention or meeting of priority service subscribers at a particular location, and during the meeting a crisis developed, the number of priority service call/session requests from that location could vastly exceed the normal or historical level upon which the preset gapping parameters were based. In another example, if there is an emergency incident, priority service subscribers and/or users tend to migrate to the affected area (as would be expected), and again, the number of priority call/session requests from this area or source can vastly exceed the historical norm on which the preset gapping parameters were based. In short, the traditional throttling mechanism described above is at times simply not flexible enough to handle the foregoing situations. Additionally, the foregoing throttling technique does not account for the overall capacity of the serving node nor the degree of invalid requests (i.e., which arrive from individuals without proper credentials). For example, a relatively large number of invalid requests may indicate a potential denial of service attack on the network.

Accordingly, a new and improved system and/or method for dynamically controlling the throttling of priority services calls in a telecommunications network is disclosed that overcomes the above-referenced problems and others.

SUMMARY

In accordance with one embodiment, a method of throttling priority service traffic in a telecommunications network is provided. The method includes: monitoring a rate at which priority service requests are received at a node of the network; comparing the rate to a threshold; disabling a gapping function for priority service traffic when the rate is less than the threshold; enabling the gapping function for priority service traffic when the rate is not less than the threshold, and, dynamically regulating a parameter of the gapping function when the gapping function is enabled.

In accordance with another embodiment, a telecommunications network includes a throttle for priority service traffic in said network. The throttle includes: monitoring means for monitoring a rate at which priority service requests are received at a node of the network; comparison means for comparing the rate to a threshold; gapping function control means for (i) disabling a gapping function for priority service traffic when the rate is less than the threshold, and (ii) enabling the gapping function for priority service traffic when the rate is not less than the threshold, and, gapping parameter regulation means for dynamically regulating a parameter of the gapping function when the gapping function is enabled.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications and/or networking arts without further detailed explanation as to their configuration or operation except to the extent they have been modified or altered in accordance with and/or to accommodate the preferred embodiment(s) presented herein.

Figure 1:
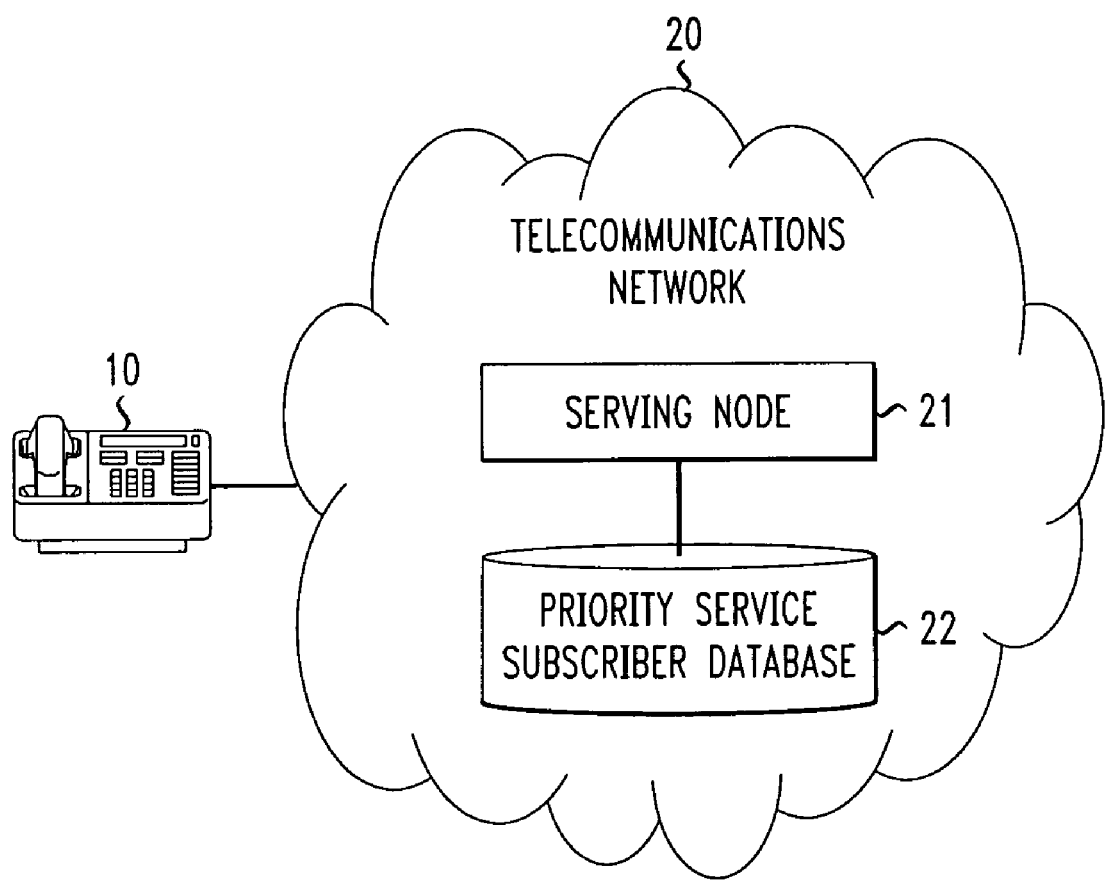
FIG. 1 is a diagram illustrating an exemplary telecommunications network suitable for practicing aspects of the present inventive subject matter.

With reference to FIG. 1, there is shown user equipment (UE) 10 that is operatively connected in the usual manner to a telecommunications network 20, e.g., a NGN. In practice, the UE 10 is optionally a telephone or other end user telecommunications device that an individual employs to selectively place calls and/or initiate sessions over the network 20, e.g., via a serving node 21 that provides the UE 10 access to the network 20. For the purposes of simplicity and/or clarity herein, only a single UE 10 has been illustrated. However, it is to be appreciated that in practice, typically, a plurality of similar UEs are likewise arranged and/or served by the network 20.

Suitably, the network 20 is a PSTN or a cellular or wireless network or some combination thereof or some other like network, e.g., a NGN. In a suitable embodiment, the network 20 is provisioned with and/or otherwise supports a priority service, such as GETS or WPS or some other similar priority service. Normally, when the priority service is successfully invoked in connection with a particular call or session, the associated call or session is afforded priority handling by the network 20 as compared to ordinary (i.e., non-priority) calls/sessions. That is to say, as compared to ordinary calls placed over the network 20, the network 20 assigns or otherwise provides a higher priority to priority calls, e.g., for purposes of call completion.

In order to obtain access to the priority service, a user subscribes to the service or otherwise registers to use the service. Subscription or registration information for the user is stored and/or maintained in a suitable location accessible by the network 20, e.g., such as a priority service subscription database (DB) 22. Suitably, the subscription information maintained in the DB 22 includes one or more of the following: the user's name (e.g., John Doe), an address associated with the user (e.g., a mailing or billing address), one or more telephone numbers or addresses associated with the user (e.g., the telephone number or IP address assigned to the UE 10) and authentication credentials established for the user. Suitably, the authentication credentials include a user name or number or other user ID and optionally a password.

To activate or invoke the priority service in connection with a particular call and/or session initiated via the UE 10, the calling party (i.e., the user or subscriber) supplies the network 20 with their authentication credentials at or near the time the call is placed or session initiated. For example, when placing the priority call or initiating the priority session, the user optionally employs the UE 10 to enter their credentials. The submitted credentials are used by the network 20 to verify that the party or user is in fact a subscriber to the priority service or is otherwise entitled to use the priority service. Suitably, the foregoing verification is performed by a validating node (VN) of the network 20, which optionally may be the same as the serving node 21. More specifically, the VN receives or otherwise obtains the credentials supplied by the user and compares the supplied credentials to the credentials maintained in the DB 22 to determine if the supplied credentials are valid.

Suitably, the network 20 also implements a throttling function in connection with the provided priority service in order to regulate the volume of priority service requests handled, e.g., at the serving node 21. According to one embodiment, a dynamic gapping technique is employed to achieve the desired throttling. More specifically, the network 20 dynamically adjusts the gapping criteria (e.g., the gap duration) based on a percentage of invalid priority service requests rather than on a fixed value. In practice, if the number of priority service requests per unit time from a given source or handled by a particular node (e.g., node 21) is below an established threshold, then no gapping occurs, i.e., the gapping function is disabled. Alternately, if the threshold is met or exceeded, then priority service gapping is invoked, i.e., the gapping function is enabled.

In one suitable embodiment, when the gapping begins, it starts with an established minimum gap interval or duration. Thereafter, each time a priority service request is rejected by the network 20 as an invalid request (i.e., the request is accompanied by invalid credentials), then the gapping parameter (i.e., the gap interval or duration) is incremented by an established amount to further space out the priority service traffic. Suitably, the gapping parameter may be incremented in this fashion until an established maximum is reached. Conversely, each time a priority service request is accepted by the network 20 as a valid request (i.e., the request is accompanied by valid credentials), then the gapping parameter (i.e., the gap interval or duration) is decremented by an established amount to further increase the allowed priority service traffic. Again, the gapping parameter is suitably decremented in this fashion until the established minimum is reached.

Figure 2:
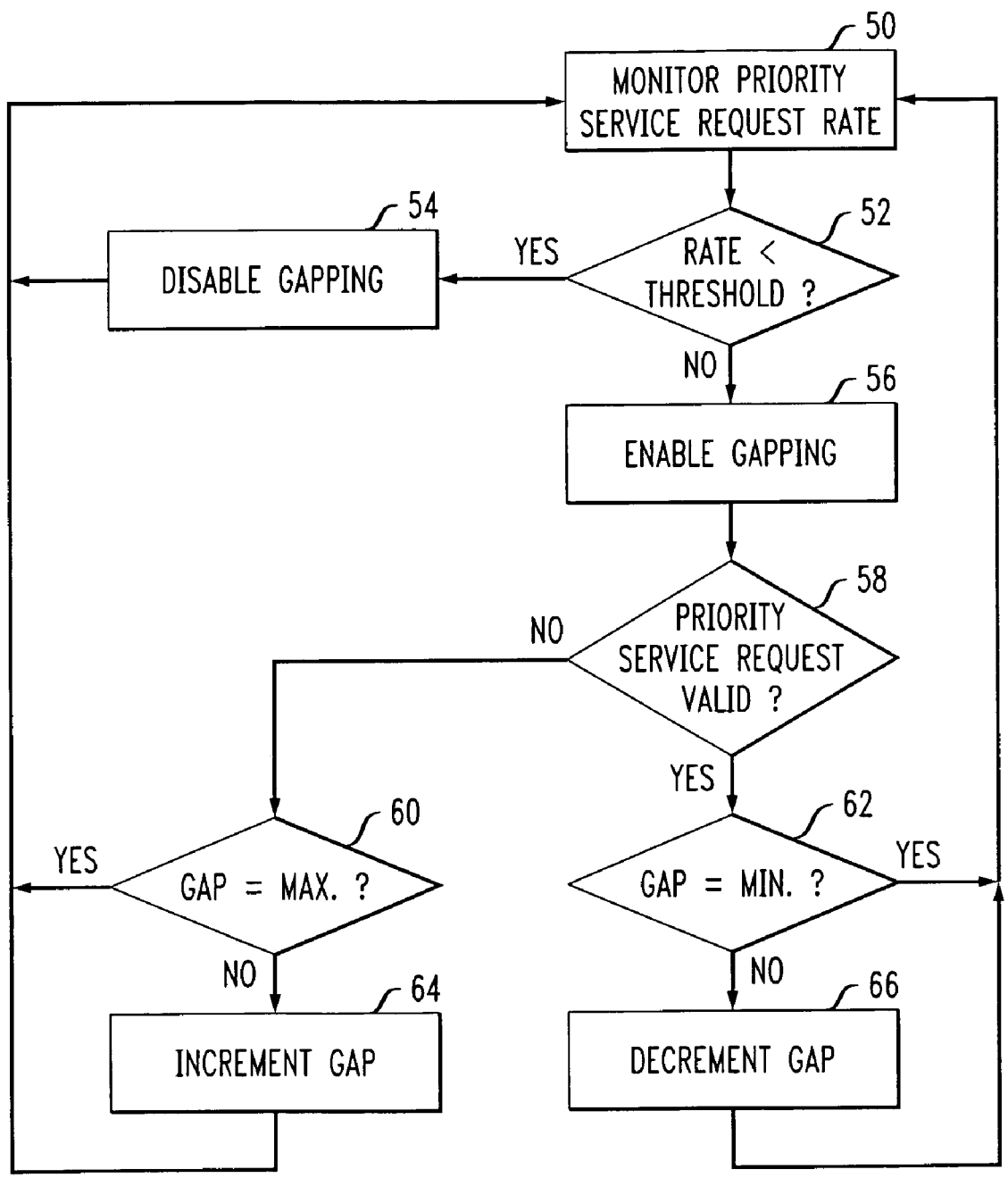
FIG. 2 is a flow chart illustrating an exemplary process suitable for practicing aspects of the present inventive subject matter.

With reference to FIG. 2, an exemplary process is shown for throttling the priority service on the network 20, e.g., at node 21.

At step 50, the priority service request rate is monitored. That is to say, for example, the network 20 monitors the number of priority service requests received by the node 21 per unit time.

At decision step 52, the priority service request rate is compared to an established threshold. If the rate is less than the threshold, then the process branches to step 54 where gapping is disabled and thereafter the process returns to step 50. Otherwise, if the rate is not less than the threshold, then the process continues to step 56 where gapping is enabled. Suitably, when the gapping begins, it is started with an established minimum gap interval or duration.

Next, at decision step 58, it is determined if a received priority service request is valid or invalid (i.e., if the request is accompanied by valid or invalid credentials). If the request is invalid, the process branches to step 60, otherwise if the request is valid, the process branches to step 62.

At decision step 60, the current gap parameter value (i.e., the current gap interval or duration) is compared to an established maximum limit. If the established maximum limit has already been reached, step 64 is bypassed and the process returns to step 50. Otherwise, if the maximum limit has not yet been reached, step 64 is executed so that the gap parameter is incremented accordingly, i.e., the gap interval or duration is increased by an established amount to further space out and/or throttle the priority service traffic. Following step 64, the process again returns to step 50.

At decision step 62, the current gap parameter value (i.e., the current gap interval or duration) is compared to the established minimum limit. If the established minimum limit has already been reached, step 66 is bypassed and the process returns to step 50. Otherwise, if the minimum limit has not yet been reached, step 66 is executed so that the gap parameter is decremented accordingly, i.e., the gap interval or duration is decreased by an established amount to further increase the allowance rate of the priority service traffic. Following step 66, the process again returns to step 50.

Suitably, e.g., in a NGN, the dynamic gapping parameter is adjusted or otherwise regulated (i.e., incremented and/or decremented as the case may be) by what is known as a Call Session Control Function (CSCF) supported in the IMS. More specifically, a Proxy-CSCF (P-CSCF) suitably regulates the dynamic gapping parameter.

While the foregoing specifically refers to priority services, the concepts and/or methods that are described herein are equally applicable to a range of premium telephone services where it is deemed advisable or desirable to dynamically throttle requests for those services. Moreover, it is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of providing priority service in a telecommunications network, comprising:
    (a) monitoring a rate at which priority service requests are received at a node of the telecommunications network;
    (b) comparing the rate to a threshold;
    (c) disabling a gapping function for priority service traffic at the node when the rate is less than the threshold;
    (d) enabling the gapping function for priority service traffic at the node when the rate is not less than the threshold, and,
    (e) dynamically regulating a parameter of the gapping function when the gapping function is enabled based at least in part on whether a select priority service request received at the node is accompanied by valid or invalid credentials, wherein the regulated parameter is a duration of a gap defined by the gapping function, the regulating comprising:
        comparing a current value of the parameter to a maximum limit and if the maximum limit has not yet been reached, then incrementing the duration of the gap by an amount when it is determined that the select priority service request is invalid.

2. The method of claim 1, wherein step (e) comprises:
    determining a validity of the select priority service request such that the parameter is dynamically regulated in response to said determination.

3. The method of claim 1, wherein step (e) further comprises:
    comparing a current value of the parameter to a minimum limit and if the minimum limit has not yet been reached, then decrementing the duration of the gap by an amount when it is determined that the select priority service request is valid.

4. A telecommunications network including a throttle for priority service traffic in said network, said throttle comprising:
    monitoring means for monitoring a rate at which priority service requests are received from user equipment by the telecommunications network;
    comparison means for comparing the rate to a threshold;
    gapping function control means for (i) disabling a gapping function for priority service traffic when the rate is less than the threshold, and (ii) enabling the gapping function for priority service traffic when the rate is not less than the threshold, and,
    gapping parameter regulation means for dynamically regulating a parameter of the gapping function when the gapping function is enabled based at least in part on whether a select priority service request received by the telecommunications network is accompanied by valid or invalid credentials'
    wherein the regulated parameter is a duration of a gap defined by the gapping function;
    wherein the gapping parameter regulation means compares a current value of the parameter to a maximum limit and if the maximum limit has not yet been reached, then the gapping parameter regulation means increments the duration of the gap by an amount when it is determined that the select priority service request is invalid.

5. The throttle of claim 4, wherein the gapping parameter regulation means comprises:

validity determination means for determining a validity of the select priority service request such that the parameter is dynamically regulated in response thereto.

6. The throttle of claim 4, wherein the gapping parameter regulation means compares a current value of the parameter to a minimum limit and if the minimum limit has not yet been reached, then the gapping parameter regulation means decrements the duration of the gap by an amount when it is determined that the select priority service request is valid.

7. The method of claim 1 wherein the priority service traffic comprises priority calls to which the telecommunications network provides a higher rate of call completion than non-priority calls.

8. The method of claim 7 wherein the priority calls include at least one of national security calls, emergency calls, government emergency telecommunication service (GETS) calls, and wireless priority service (WPS) calls.

9. The throttle of claim 4 wherein the priority service traffic comprises priority calls to which the telecommunications network provides a higher rate of call completion than non-priority calls.

10. The throttle of claim 9 wherein the priority calls include at least one of national security calls, emergency calls, government emergency telecommunication service (GETS) calls, and wireless priority service (WPS) calls.

11. A method of providing priority service in a telecommunications network, comprising:
   a) monitoring a rate that priority service requests are received at a serving node of a telecommunications network;
   b) comparing the priority service request rate to a gapping threshold;
   c) enabling a gapping function for priority service traffic at the serving node when the priority service request rate is not less than the gapping threshold,
   d) determining if each priority service request associated with the priority service traffic at the serving node is accompanied by invalid credentials when the gapping function is enabled; and,
   e) dynamically regulating a gap duration parameter of the gapping function at the serving node for priority service requests accompanied by invalid credentials by incrementing the gap duration parameter unless a current value of the gap duration parameter has reached a maximum limit.

12. The method of claim 11, further comprising:
   f) determining if each priority service request associated with the priority service traffic at the serving node is accompanied by valid credentials when the gapping function is enabled; and,
   g) dynamically regulating the gap duration parameter of the gapping function at the serving node for priority service requests accompanied by valid credentials by decrementing the gap duration parameter unless a current value of the gap duration parameter has reached a minimum limit.

13. The method of claim 11 wherein the priority service traffic at the serving node comprises priority calls to which the telecommunications network provides a higher rate of call completion than other calls.

14. The method of claim 13 wherein the priority calls include government emergency telecommunication service (GETS) calls.

15. The method of claim 13 wherein the priority calls include wireless priority service (WPS) calls.

16. The method of claim 13 wherein the other calls include at least one of ordinary calls and non-priority calls.

17. A method of providing priority service in a telecommunications network, comprising:
   (a) monitoring a rate at which priority service requests are received at a node of the telecommunications network;
   (b) comparing the rate to a threshold;
   (c) disabling a gapping function for priority service traffic at the node when the rate is less than the threshold;
   (d) enabling the gapping function for priority service traffic at the node when the rate is not less than the threshold, and,
   (e) dynamically regulating a parameter of the gapping function when the gapping function is enabled based at least in part on whether a select priority service request received at the node is accompanied by valid or invalid credentials, wherein the regulated parameter is a duration of a gap defined by the gapping function, the regulating comprising:
      comparing a current value of the parameter to a minimum limit and if the minimum limit has not yet been reached, then decrementing the duration of the gap by an amount when it is determined that the select priority service request is valid.

18. The method of claim 17, wherein step (e) comprises:
   determining a validity of the select priority service request such that the parameter is dynamically regulated in response to said determination.

19. A telecommunications network including a throttle for priority service traffic in said network, said throttle comprising:
   monitoring means for monitoring a rate at which priority service requests are received from user equipment by the telecommunications network;
   comparison means for comparing the rate to a threshold;
   gapping function control means for (i) disabling a gapping function for priority service traffic when the rate is less than the threshold, and (ii) enabling the gapping function for priority service traffic when the rate is not less than the threshold, and,
   gapping parameter regulation means for dynamically regulating a parameter of the gapping function when the gapping function is enabled based at least in part on whether a select priority service request received by the telecommunications network is accompanied by valid or invalid credentials'
   wherein the regulated parameter is a duration of a gap defined by the gapping function;
   wherein the gapping parameter regulation means compares a current value of the parameter to a minimum limit and if the minimum limit has not yet been reached, then the gapping parameter regulation means decrements the duration of the gap by an amount when it is determined that the select priority service request is valid.

20. The throttle of claim 19, wherein the gapping parameter regulation means comprises:
   validity determination means for determining a validity of the select priority service request such that the parameter is dynamically regulated in response thereto.

* * * * *